US008761177B2

(12) United States Patent
O'Brien et al.

(10) Patent No.: US 8,761,177 B2
(45) Date of Patent: Jun. 24, 2014

(54) TELECOMMUNICATION SYSTEMS

(75) Inventors: Raymond O'Brien, Ardnacrusha (IE); Francis Melinn, Shannon (IE)

(73) Assignee: Tellabs Emea Holdings Limited, Dublin (IE)

(*) Notice: Subject to any disclaimer, the term of this patent is extended or adjusted under 35 U.S.C. 154(b) by 87 days.

(21) Appl. No.: 13/067,621

(22) Filed: Jun. 15, 2011

(65) Prior Publication Data
US 2011/0249675 A1    Oct. 13, 2011

Related U.S. Application Data

(63) Continuation of application No. 10/983,893, filed on Nov. 9, 2004, now Pat. No. 7,974,274, which is a continuation of application No. 09/581,476, filed as application No. PCT/IE98/00103 on Dec. 15, 1998, now abandoned.

(30) Foreign Application Priority Data

Dec. 15, 1997  (IE) .......................................... 970885
Aug. 31, 1998  (IE) ...................................... S980709

(51) Int. Cl.
*H04L 12/28* (2006.01)
(52) U.S. Cl.
USPC ........................................................ 370/392
(58) Field of Classification Search
None
See application file for complete search history.

(56) References Cited

U.S. PATENT DOCUMENTS

| 4,535,448 | A |   | 8/1985  | Baxter |
| 4,723,238 | A |   | 2/1988  | Isreal et al. |
| 4,817,086 | A |   | 3/1989  | Oye et al. |
| 5,062,108 | A |   | 10/1991 | Bales et al. |
| 5,093,827 | A |   | 3/1992  | Franklin et al. |
| 5,305,308 | A |   | 4/1994  | English et al. |
| 5,359,600 | A |   | 10/1994 | Ueda et al. |
| 5,412,655 | A |   | 5/1995  | Yamada et al. |
| 5,414,707 | A |   | 5/1995  | Johnston et al. |
| 5,546,392 | A |   | 8/1996  | Boal et al. |
| 5,719,858 | A |   | 2/1998  | Moore |
| 5,812,541 | A |   | 9/1998  | Fuentes |
| 5,818,836 | A |   | 10/1998 | DuVal |
| 5,844,887 | A | * | 12/1998 | Oren et al. ..................... 370/218 |
| 5,844,901 | A | * | 12/1998 | Holden et al. ................ 370/399 |
| 5,910,954 | A | * | 6/1999  | Bronstein et al. ............. 370/401 |
| 5,912,888 | A |   | 6/1999  | Walsh et al. |
| 5,936,952 | A |   | 8/1999  | Lecomte |
| 5,982,783 | A |   | 11/1999 | Frey et al. |
| 5,999,529 | A |   | 12/1999 | Bernstein et al. |
| 6,002,689 | A | * | 12/1999 | Christie et al. ................ 370/401 |
| 6,026,086 | A |   | 2/2000  | Lancelot |

(Continued)

OTHER PUBLICATIONS

J. Heinanen, Multiprotocol Encapsulation over ATM Adaptation Layer 5, RFC 1483, Network Working Group, The Internet Society, Jul. 1993.*

*Primary Examiner* — Robert Wilson
*Assistant Examiner* — Ronald H Davis
(74) *Attorney, Agent, or Firm* — Jacobson Holman, PLLC

(57) ABSTRACT

A telecommunications system having a format converter provides bi-directional communications between TDM signals on one side and ATM signals on the other. An ATM aggregate receives and transmits ATM signals, and a TDM interface receives and transmits TDM signals. The format converter has an ATM bus and a TDM bus connected to their respective interfaces, and service-specific adapters are connected between the ATM bus and the TDM bus.

19 Claims, 5 Drawing Sheets

(56) References Cited

U.S. PATENT DOCUMENTS

| | | | |
|---|---|---|---|
| 6,049,543 A * | 4/2000 | Sauer et al. | 370/335 |
| 6,064,653 A | 5/2000 | Farris | |
| 6,067,299 A | 5/2000 | DuRee | |
| 6,075,784 A | 6/2000 | Frankel et al. | |
| 6,125,117 A | 9/2000 | Martin et al. | |
| 6,151,325 A * | 11/2000 | Hluchyj | 370/398 |
| 6,151,628 A | 11/2000 | Xu et al. | |
| 6,198,738 B1 | 3/2001 | Chang et al. | |
| 6,205,134 B1 | 3/2001 | Jordan et al. | |
| 6,240,084 B1 | 5/2001 | Oran et al. | |
| 6,246,750 B1 | 6/2001 | Ehreth | |
| 6,304,574 B1 | 10/2001 | Schoo et al. | |
| 6,363,065 B1 | 3/2002 | Thornton et al. | |
| 6,480,511 B1 | 11/2002 | Petty | |
| 6,556,563 B1 | 4/2003 | Yarlagadda | |
| 6,577,623 B1 | 6/2003 | Kawai et al. | |
| 6,580,689 B1 | 6/2003 | Nagai et al. | |
| 6,665,293 B2 | 12/2003 | Thornton et al. | |
| 6,678,284 B1 | 1/2004 | Verthein et al. | |
| 6,751,207 B1 | 6/2004 | Lee et al. | |
| 6,760,324 B1 | 7/2004 | Scott et al. | |
| 6,795,444 B1 | 9/2004 | Vo et al. | |
| 6,798,767 B1 | 9/2004 | Alexander et al. | |
| 6,868,080 B1 | 3/2005 | Umansky et al. | |
| 2001/0005379 A1 | 6/2001 | Pickett | |
| 2002/0064151 A1 | 5/2002 | Sorrentino | |
| 2003/0039251 A1 | 2/2003 | Hara et al. | |
| 2003/0192053 A1 | 10/2003 | Sheppard et al. | |
| 2004/0228333 A1 | 11/2004 | Schnell et al. | |

\* cited by examiner

TELECOMMUNICATION SYSTEMS

This is a continuation application of patent application Ser. No. 10/983,893 filed Nov. 9, 2004, now U.S. Pat. No. 7,974,274 which is a continuation of patent application Ser. No. 09/581,476 filed Jun. 14, 2000, now abandoned which is a nationalization of international application No. PCT/IE98/00103 filed Dec. 15, 1998, claiming benefit of Irish patent application No. 970885 filed Dec. 15, 1997 and Irish patent application No. 5980709 filed Aug. 31, 1998, and hereby claims the foregoing priority to which it is entitled.

BACKGROUND OF THE INVENTION

1. Field of the Invention

The invention relates generally to telecommunication systems and more particularly to development of such systems to allow use of different communication formats.

2. Description of the Related Art

The most common communication format for telecommunication systems is time division multiplexing (TDM) which is a continuous bit rate service concatenated as multiples of 64 kb/s channels. The TDM technique is particularly effective for voice communication because it is connection-oriented, i.e. a connection link is established initially and is maintained throughout a communication session. Also, the speed and reliability are sufficient for voice.

However, TDM is not particularly effective for data traffic because it is inflexible and does not accommodate the "bursty" nature of data very well. It was for this reason that packet-based techniques have been developed for data communication. For example, the Internet Protocol (IP) technique is used for much Internet service provider (ISP) and local area network (LAN) communication. This technique uses variable-length packets, each of which is independently routed. This means that the technique is not connection-oriented and the bandwidth for a call is not guaranteed for the duration of the call. The general view is that voice subscribers would not tolerate the ensuing unpredictability of call quality. Also, the equipment required for processing to achieve the required speed for voice is quite complex. Therefore, while the IP technique is an approach which may be used to some extent in the future for both voice and data telecommunication networks, problems need to be overcome.

Another packet-based technique is the asynchronous transfer mode (ATM) technique. This has the advantages that it is packet-based and so can handle bursty data traffic well, and is also connection-oriented. In this technique, data is transmitted in fixed-length packets which are typically 53 Bytes in length, having a 48 Byte payload and a 5 Byte header. The header comprises a virtual path identifier (VPI) and a virtual channel identifier (VCI). According to the ATM standard, the cell transfer technique is common to all services and therefore a single ATM stream of cells can include a wide range of different services. Because the cells have a fixed length, timing and control is more predictable. On the other hand, packets in the IP technique are often much longer than ATM cells.

Packet-based techniques are radically different from the TDM technique and therefore it is not practical for a telecommunication operator to change over in a short period of time. In order to introduce packet-based techniques such as ATM, adaptation processes have been developed which are service-specific as different reconstruction techniques are involved. This has led to a large degree of complexity and expense.

It is also known to provide a hybrid system in which TDM and ATM signals are combined in a frame for communication over a link. Such an arrangement is described in PCT Patent Specification No. WO 97/18649 (DSC Communications Corp.). While this arrangement is suitable for specific application areas such as provision of services to a home, it does not appear to be efficient enough for telecommunication networks. This is particularly the case if a number of different services are involved.

European Patent Specification No. EP614324 (Nippon) describes a system for separate TDM/ATM and ATM/TDM conversion. However, this system appears to be quite complex and to be difficult to scale up for increased transaction volume capacity.

OBJECTS OF THE INVENTION

The present invention is therefore directed towards providing a telecommunication system to allow simpler growth in packet-based technologies in a telecommunication network.

In this specification, the term "packet" is intended to mean both variable-length packets and fixed-length packets (cells). Also, in the remainder of the specification, the term "data" is intended to cover all services, including voice.

SUMMARY OF THE INVENTION

According to the invention, there is provided a telecommunication system comprising:
 a system TDM interface comprising means for receiving and transmitting TDM data streams;
 a system packet communication interface comprising means for receiving and transmitting data packet streams; and
 a format converter comprising means for performing bi-directional conversion between the interfaces.

By providing bi-directional conversion, the invention allows conversion of telecommunications systems to technologies such as ATM in a gradual manner. Of course, it also allows interfacing of packet-based systems with TDM systems.

In one embodiment, the format converter comprises a TDM bus connected to the TDM interface, a packet bus connected to the packet communication interface, and a conversion means connected between the two buses. Use of buses in this manner allows a great deal of flexibility in configuration of the conversion means, both in relation to services and hardware and software functionality.

Preferably, the conversion means comprises at least one service-specific adaptation module. Such modules operate efficiently for their particular service, and this arrangement also allows modularity on a service basis.

In one embodiment, the system further comprises a system controller comprising means for controlling operation of circuits in the system. This allows centralized general control. Preferably, the system controller is connected to the packet bus. This allows utilization of the packet bus for control signals, thus allowing very effective distribution of control signals in a simple manner.

In one embodiment, the system controller comprises means for transmitting and receiving system control signals via the packet bus to the packet communication interface and the format converter, and means for transmitting and receiving system control signals to the TDM interface via a separate TDM control signal link. Thus, conventional-format control signals are used for the TDM circuits.

In one embodiment, the control signals comprise cells such as ATM cells.

Preferably, the system packet communication interface and the format converter comprise means for adding an additional header to each cell to direct routing of the cells within the system. This is a simple and effective way of efficiently distributing cells within the system. For example, the additional header may correlate a virtual circuit with an adaptation module.

In one embodiment, each adaptation module comprises a cell processor connected to an adaptation circuit. By using a cell processor, there is flexibility in the range of cell-processing operations which may be performed.

In another embodiment, each adaptation module further comprises a control processor, and the cell processor comprises means for routing control signal cells to the control processor. By separating control and cell processing, the configuration is simple and easily controlled.

The cell processor routing means may comprise a segmentation and reassembly interface connected to a separate segmentation and reassembly circuit, which is in turn connected to the control processor.

Ideally, the cell processor comprises means for stripping additional headers from cells as they are routed to the segmentation and reassembly circuit.

In one embodiment, the cell processor comprises means for maintaining a plurality of output queues for routing of cells to the TDM bus, the queues being maintained on a priority scheme according to VPI/VCI headers. The allows excellent flexibility in traffic management.

Preferably, each cell processor comprises a mapping function for addition of the additional headers.

Ideally, the cell processor comprises a dedicated ASIC. This allows very efficient cell processing, and also modular construction of the system at a lower level than the system interface and adaptation functions. For example, the system packet communication interface may comprise a cell processor and a bus interface, and the cell processor of the interface may comprise a similar configuration to the cell processor of each adaptation module.

In one embodiment, the system packet communication interface further comprises a control processor, and the cell processor comprises means for routing control signal cells to the control processor.

According to another aspect, the invention provides a telecommunication system comprising:
 a TDM interface comprising means for receiving and transmitting TDM data streams;
 an ATM interface comprising means for receiving and transmitting ATM data streams;
 A format converter comprising a TDM bus connected to the TDM interface, an ATM bus connected to the ATM interface, and at least one service-specific adaptation module connected between the buses; and
 a system controller.

In one embodiment, the system controller is connected to the ATM bus and comprises means for communicating with the ATM interface and each adaptation module using cells.

In one embodiment, each adaptation module and the ATM interface comprise means for routing control signal cells with additional headers for internal routing.

BRIEF DESCRIPTION OF THE DRAWINGS

These and other objects of the present invention will be more clearly understood from the following description of some embodiments thereof, given by way of example only with reference to the accompanying drawings.

DETAILED DESCRIPTION OF THE PREFERRED EMBODIMENTS

Figure 1A:
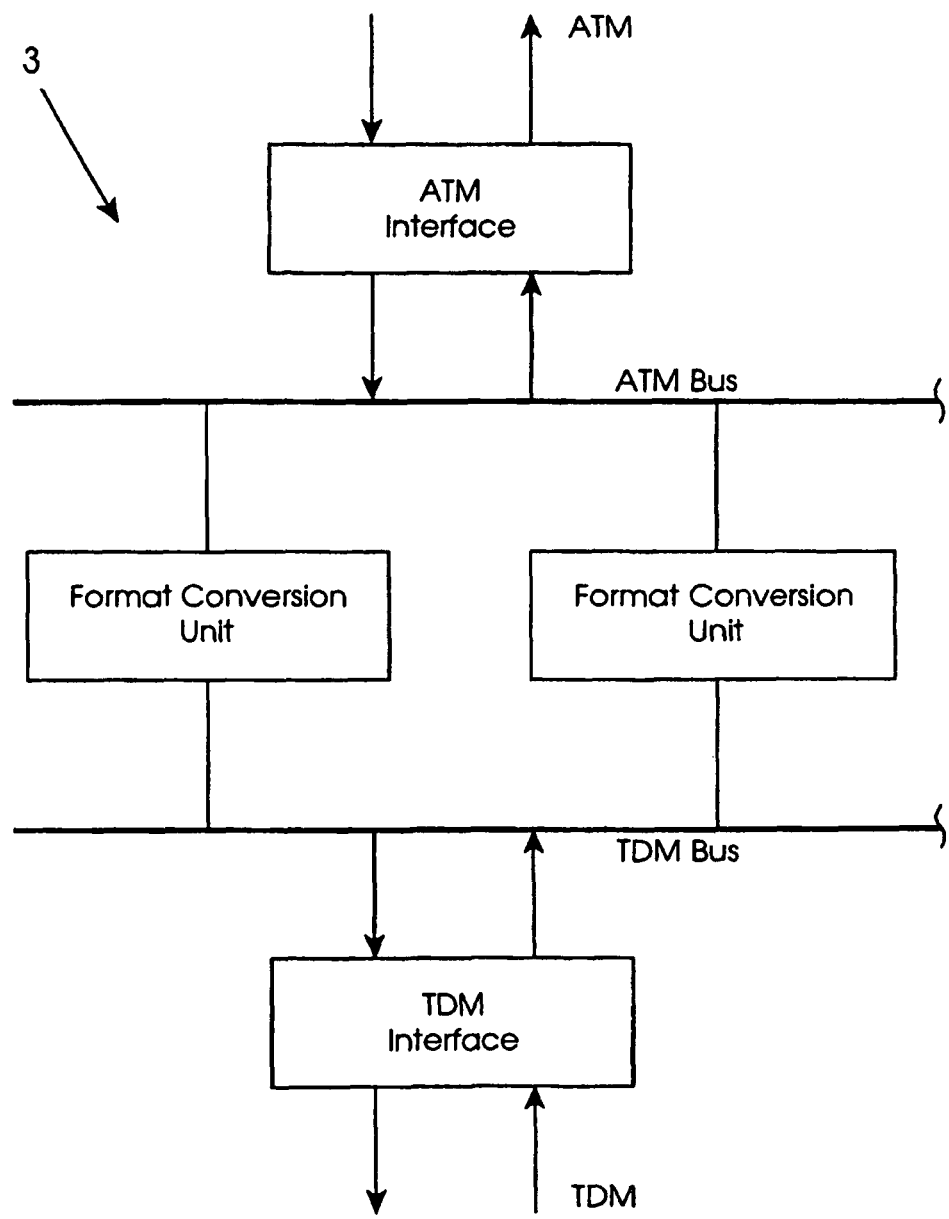
FIGS. 1(a) and 1(b) are overview schematic representations of a telecommunication system of the invention.

Referring to the drawings, there is illustrated a telecommunication system 1. The purpose of the system 1 is to provide bi-directional conversion between TDM signals on one side and packet-based signals on the other. In this embodiment, the packet-based signals are ATM signals. Conversion is provided in a comprehensive manner whereby a wide variety of different services may be incorporated in the incoming ATM or TDM signals.

Figure 1B:
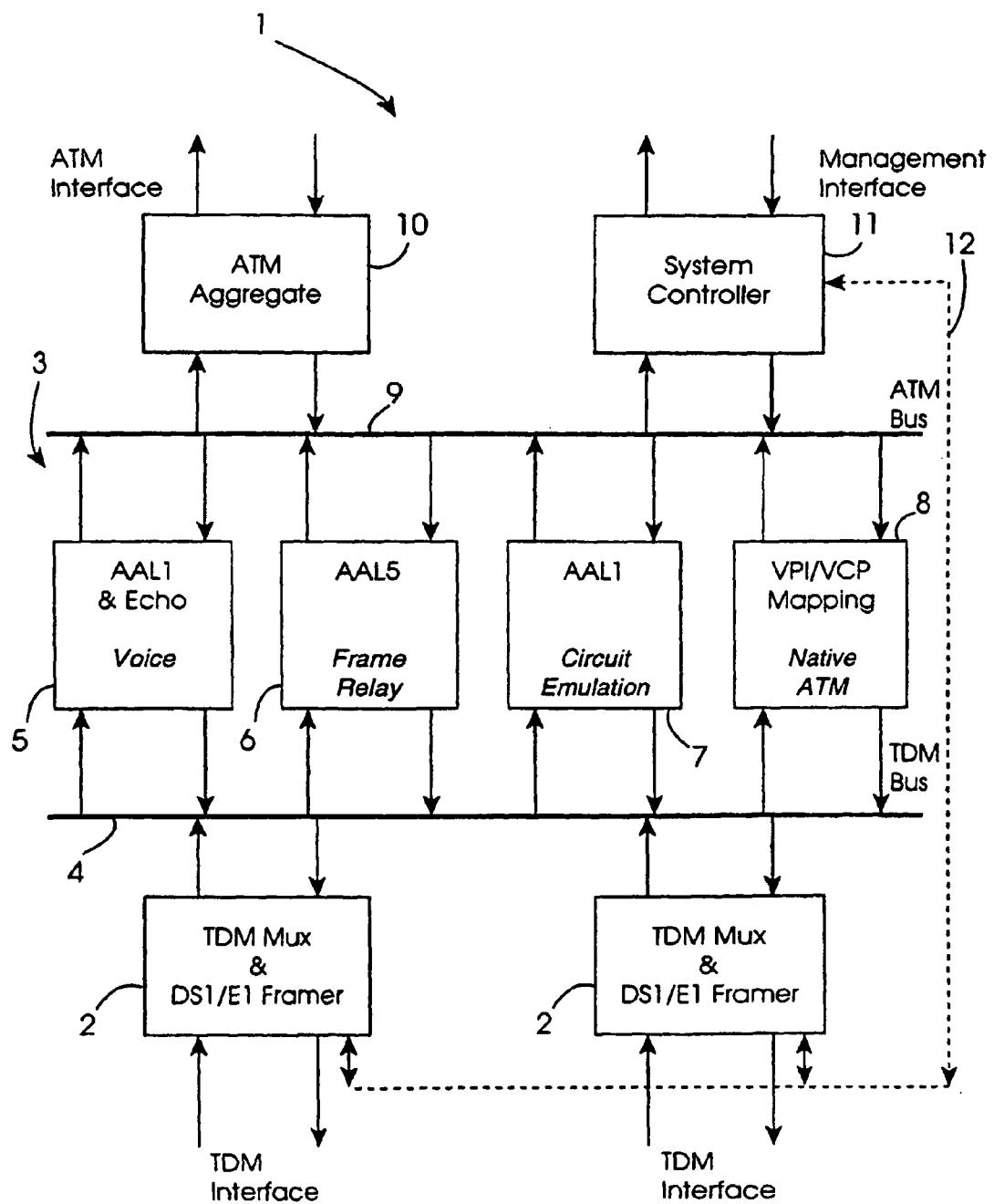

FIGS. 1(a) and 1(b) show overviews of the system 1. Referring initially to FIG. 1(a), the system 1 is shown at a high level. A bi-directional TDM interface interfaces with external systems in the TDM network and a bi-directional ATM interface interfaces with external systems in the ATM network. Within the system 1, TDM signals are delivered into, and retrieved from, a TDM bus 4 and ATM signals are delivered onto and retrieved from an ATM bus 9. The buses are part of a format converter which also comprises multiple format conversion units connected between them.

FIG. 1(a) illustrates an important aspect of the invention which is the fact that the TDM and ATM interfaces each communicate their relevant signals within the system via a bus. This allows flexibility in configuration of the format converter as any desired number and type of format conversion units may be connected between the TDM and ATM buses. These units may be service-specific. Therefore an important aspect of the invention is that the format conversion flexibility applies to allocation of services and also to allocation of circuits within the system for service and hardware utilization flexibility.

In more detail, and referring to FIG. 1(b), the system 1 comprises in this embodiment three TDM interface units 2 operating at 45 Mb/s. Only two are illustrated, for clarity. The interface units 2 are programmed to demultiplex received TDM signals and to multiplex outgoing TDM signals. Differentiation of services in the signals is achieved by recognition of framing patterns.

The format converter is indicated by the numeral 3 and comprises a TDM bus 4, adaptation modules 5 to 8, and an ATM bus 9. Thus the format conversion units are service-specific adaptation units or modules, namely voice 5, frame relay 6, circuit emulation 7, and native ATM 8 adaptation modules. Each adaptation module is programmed to extract the relevant incoming TDM or ATM signal for its service, to convert the signal, and to route the converted signal onto the opposite bus for output at the relevant interface. In this embodiment, one module per service is used, however, the flexibility allowed by the architecture allows multiple modules per service.

The ATM interface comprises an ATM aggregate 10 operating at 155 Mb/s.

The manner in which the adaptation modules extract the relevant signals is according to control signals from a system controller 11. The controller 11 directs control signals via the ATM bus 9 for the ATM aggregate 10 and for the adaptation modules. The communications protocol is ATM, with specific internal headers. This has been found to be a particularly convenient form of communication. The controller 11 communicates with the TDM interfaces via a separate dedicated link 12 because the latter does not have access to ATM signals.

Figure 2:
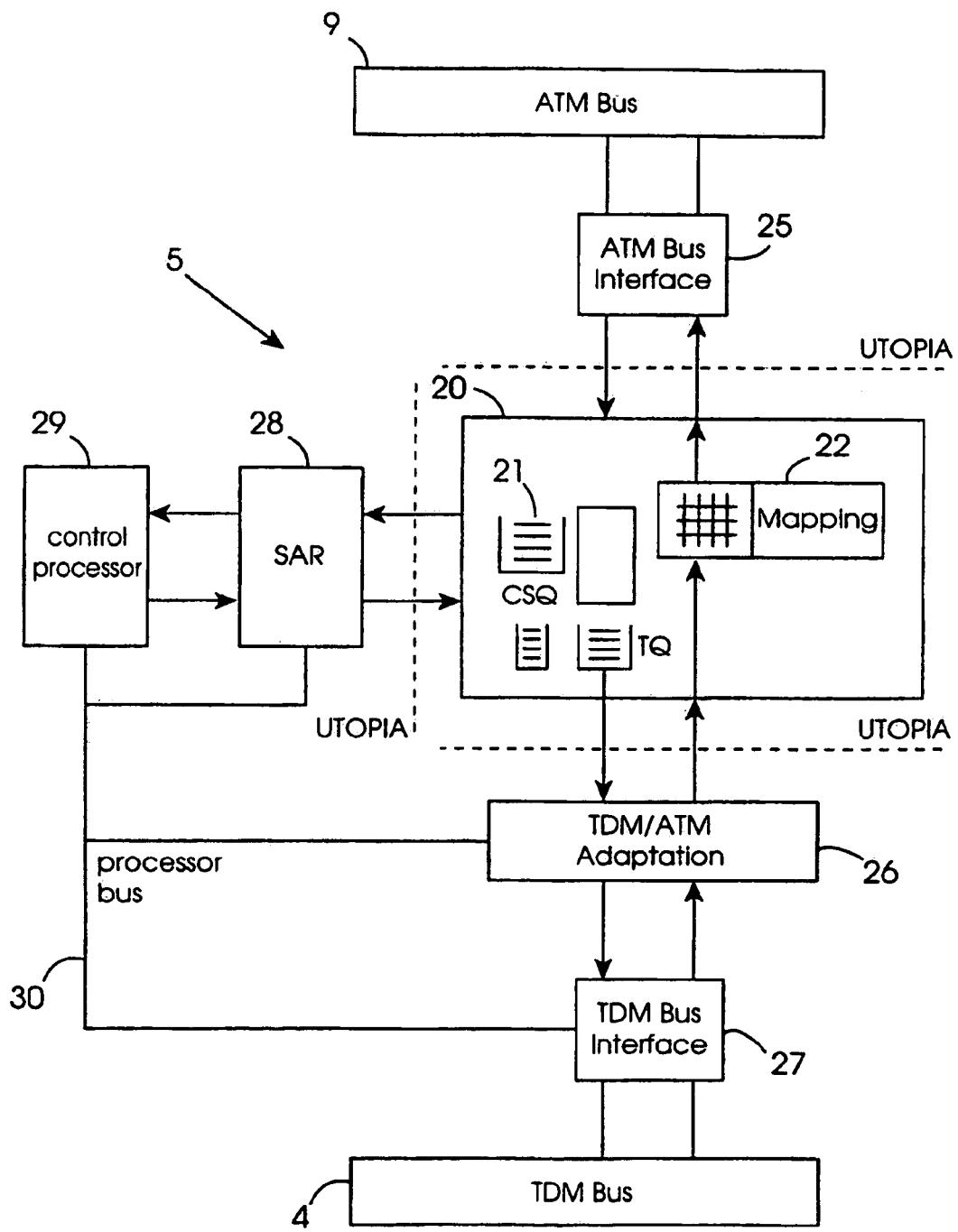
FIG. 2 is a diagram illustrating construction of an adaptation module of the system.

Referring now to FIG. 2, construction of an individual adaptation module is illustrated, in this case the voice adaptation module 5. The module 5 comprises an ASIC cell processor 20 having inter alia a routing function 21 and a mapping function 22. There is an ATM bus interface 25 connecting it to the ATM bus 9. On the other side, the module 5 is connected via a TDM/ATM adaptation device 26 and a TDM bus interface 27 to the TDM bus 4. For internal control, the module 5 comprises a Segmentation and Reassembly device (SAR) 28 connected to the cell processor 20 and on the other side to a control processor 29. The control processor 29 is connected by a control bus 30 to the SAR 28, the cell processor 20, the adaptation circuit 26, and to the TDM bus interface 27.

Figure 3:
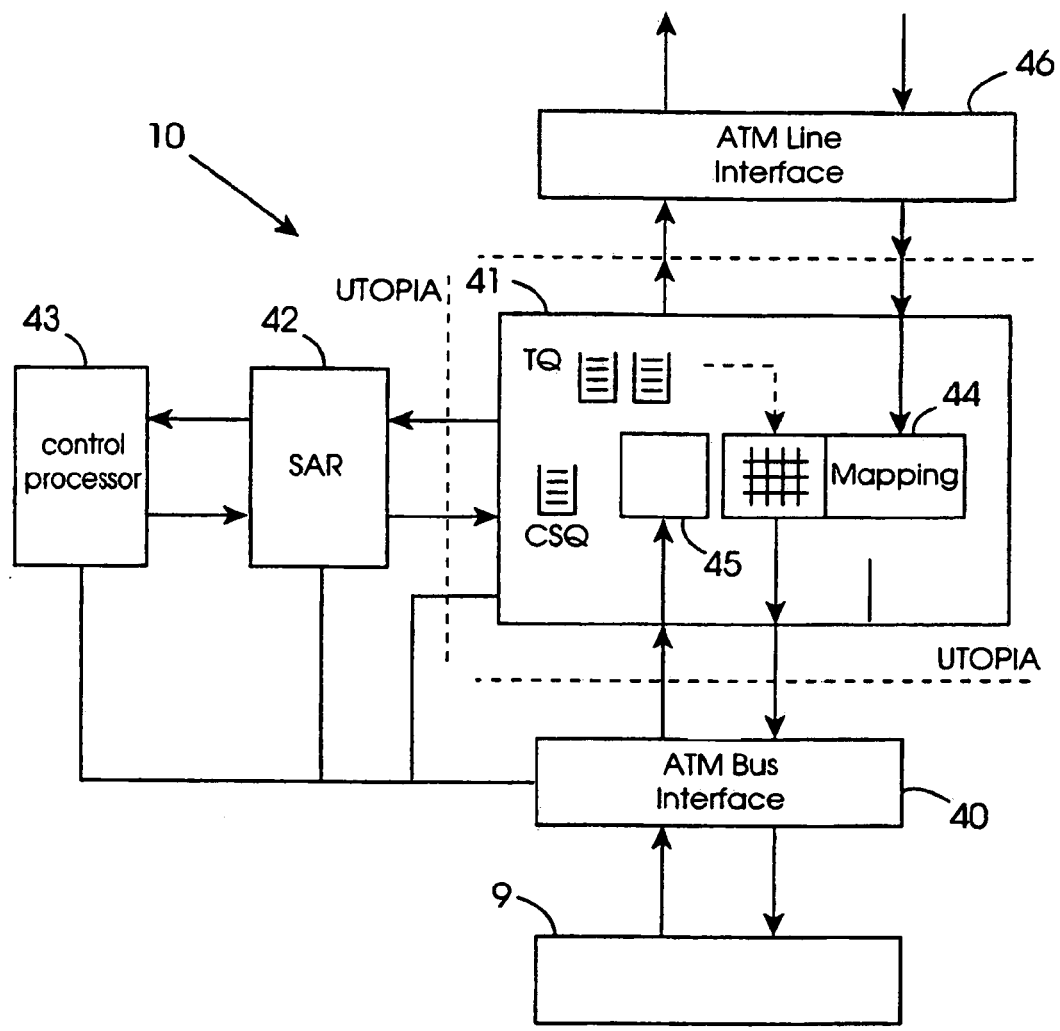
FIG. 3 is a diagram illustrating a system ATM interface of the system.

As illustrated in FIG. 3 the ATM aggregate 10 has the configuration of an ATM bus interface 40 (connected to the ATM bus 9), a cell processor 41, a SAR 42, and a control processor 43. This configuration may be regarded as a general modular circuit for the system as it forms part of each of the modules 5 to 8. Within the cell processor 41, there is a mapping function 44 and a routing function 45. The latter maintains control signal queues (CSQ) and traffic queues (TQ).

In operation, when a cell is received at the ATM aggregate 10, the VPI/VCI is used by the mapping function 44 in the cell processor 41 to determine the relevant circuit. The mapping function 44 adds an additional 4 Byte header accordingly. This header allows the relevant adaptation module ATM bus interface 25 to extract the cell and pass it to the routing function 21 of the associated cell processor 20. Where there are a number of adaptation modules for each service the additional header specifies the particular ATM bus interface 25 by correlation of the virtual circuit with a physical circuit. This is important for internal traffic management.

The system controller 11 also transmits cells, namely control signal cells to the ATM bus 9. Again, an additional header is used for routing. The routing function reads the additional header 21 to determine whether each cell is part of a control signal or is a traffic cell. If part of a control signal, it strips off the additional header and writes the remainder (in conventional 53 Byte format) to an output control signal queue (CSQ). Thus, the SAR 28 only handles conventional-format cells, which it converts to messages recognized by the control processor 29. The control processor 29 acts upon these signals to transmit bus control signals to the various parts of the adaptation module. For example, it may set the manner in which the TDM bus interface 27 extracts TDM signals from the TDM bus 4. The control processor 29 transmits responses such as set-up verification signals, failure condition information etc., to the system controller 11 via the SAR 28 and the mapping function 22. This allows the system controller to monitor status of the system 1.

If a received cell is part of the system traffic, the additional 4-Byte header is again stripped off, but the remaining cell is placed in a relevant traffic queue (TQ). The particular queue is chosen according to the VPI/VCI and the additional header to take account of criteria such as service priority. The cells are converted by the adaptation circuit 26, which is pre-configured for and specific to the particular service. The TDM bus interface 27 in turn places the TDM signals on the TDM bus 4.

In the other direction, the manner in which TDM signals are extracted is controlled by the control processor 29 according to control signals from the system controller 11. Examples of extraction conditions are timeslots to be extracted or whether echo cancellation is required.

These signals are converted by the adaptation circuit 26, which outputs ATM cells to the mapping function 22. This function has a look-up table which inserts the additional header for system use. They may specify, for example, a particular ATM aggregate 10 if there are several of them.

The output cell is then directed to the ATM bus interface 25 and then onto the ATM bus 9. It will be noted that the incoming cells from the TDM side do not include control signal cells—all being traffic cells. The cells are retrieved by the ATM bus interface 40 of the ATM aggregate 10, which in turn directs them to the routing function 45. As control signal cells are also received in this manner, the routing function 45 maintains both traffic queues TQ and control signal queues CSQ.

Figure 4:
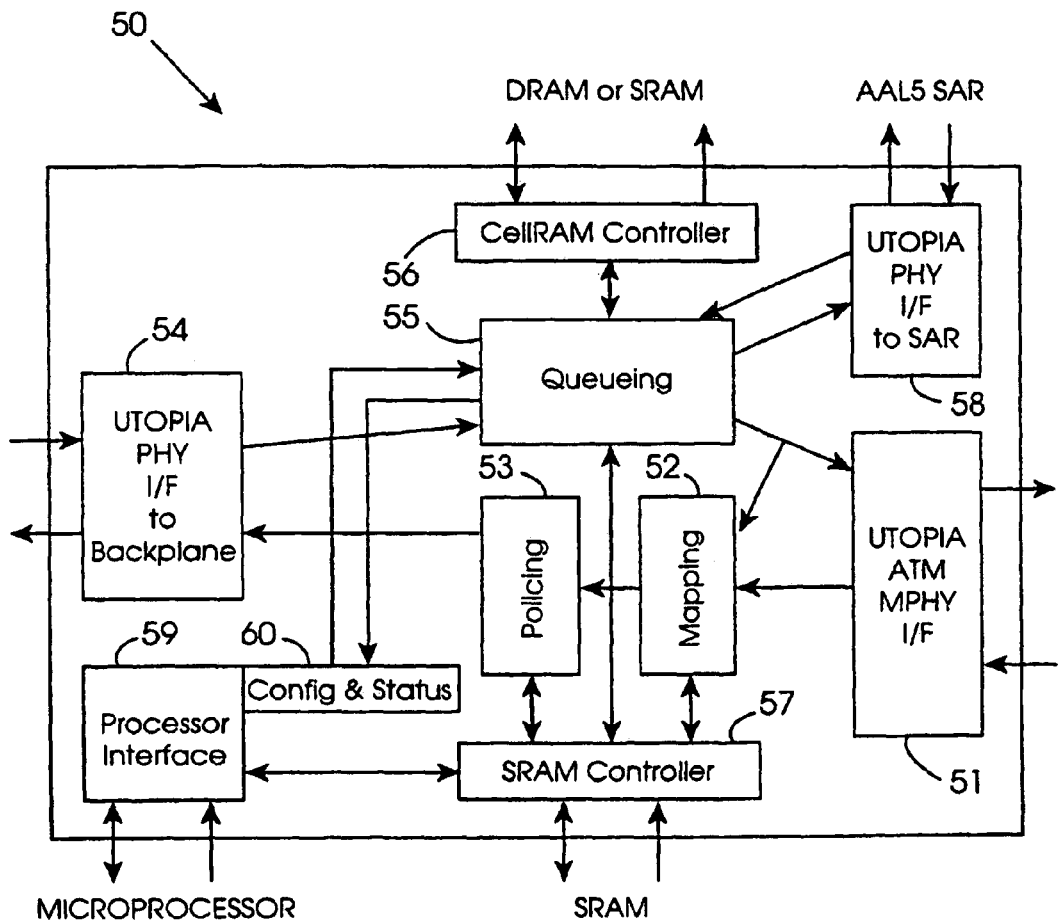
FIG. 4 is a diagram illustrating an ASIC of the system.

The cell processors 20 and 41 each comprise an ASIC 50, illustrated in FIG. 4. Cell rates of up to 373 K cells per second are handled. Cells from the line (controlled rate flow) are received by a UTOPIA line interface 51, which passes them to a mapping circuit 52 which performs the VPI/VCI mapping. A policing circuit 53 performs usage parameter control (UPC) by which cells are admitted based on programmed rate control limits. Statistics are kept on the number of cells admitted, number of bad cells, number of policed cells, and the number of disabled cells. The cells are then passed to a backplane interface 54 for transfer, for example, onto the ATM bus interface 25.

In the other direction, cells are received by the backplane interface 54 and passed for queue control to a queuing circuit 55. This uses a cell RAM controller 56 to store queued cells externally, and an SRAM controller 57 to store queue configuration data. The queues are maintained for the line interface 51, and for a SAR interface 58. Thus, the queuing circuit 55 together with the cell RAM controller 56 and the SRAM controller 57 implement the routing function. As will be appreciated from FIGS. 2 to 4, the queuing is primarily unidirectional. In the case of the adaptation modules, the cells from the TDM/ATM adaptation circuit 26 arrive at a controlled rate and queuing is not necessary. However, in the opposite direction, there is less control over the rate of the incoming traffic cells, and control signal cells are also included. In the case of the ATM aggregate 10, there is synchronization with the ATM line interface 46 and queuing is not necessary. However, in the opposite direction there is less control as varying numbers of adaptation modules operate at full capacity, and of course control signal cells are also included.

A processor interface 59 with a configuration and status circuit 60 allow processor access to, for example, configure the SRAM initially for such things as queue control. However, most on-going control is performed using ATM cells via the SAR interface 58.

The processor interface 59 may also receive and transmit cells to/from any of the local or remote cell interfaces in the system, and has the additional ability to insert a CRC-10 check sum on cells it transmits and to verify a CRC-10 check sum on cells it receives. This is useful for generating OAM cells and for verifying the validity of OAM cells. The processor interface 59 is also used for gathering statistical information on the number of ATM cells in the system.

It will be appreciated that the invention provides for relatively simple migration of telecommunication networks to ATM transmission. The system has a large degree of flexibility provided by the array of different adaptation modules. This allows multiple services to interwork over high speed transmission paths between two network types by converting each service in an appropriate adaptation function.

The invention is not limited to the embodiments hereinbefore described, but may be varied in construction and detail within the scope of the claims. For example, while the embodiment illustrated has an ATM interface, this may instead be for any packet-based communication technique such as IP. In this case the bus connected to this interface handles packets. However, it is still preferred that fixed length packet (cells) are used for internal control and data rather than variable-length packets. This is because such packets generally allow more predictable timing of internal signal routing. The packet communication interface would perform conversion between the external variable-length and the internal fixed-length packet environments. For example, a segmentation and reassembly device may be used.

What is claimed is:

1. A format converting device for performing bi-directional conversion within a telecommunication system comprising:
   a time division multiplexing (TDM) bus connected to a TDM interface and configured to receive and transmit data streams;
   a packet bus connected to a packet communications interface and configured to receive and transmit data packet streams;
   a separate segmentation and reassembly circuit; and
   a service-specific adaptation unit connected between the TDM bus and the packet bus, the service-specific adaptation unit including a cell processor connected to an adaptation circuit and a control processor, the cell processor having a routing function that routes system control signal cells to the control processor through a segmentation and reassembly interface connected to the separate segmentation and reassembly circuit.

2. The format converting device as claimed in claim 1, wherein the packet bus is connected to a system controller within the telecommunication system.

3. The format converting device as claimed in claim 2, wherein the system controller is configured to transmit and receive system control signals via the packet bus to the format converting device.

4. The format converting device as claimed in claim 1, wherein the cell processor strips additional headers from control signals as the control signals are routed to the segmentation and reassembly circuit.

5. The format converting device as claimed in claim 4, wherein the control signals are cells, said device being configured to add an additional header to each control signal cell to direct routing of the control signal cells within the telecommunication system.

6. The format converting device as claimed in claim 5, wherein the bi-directional conversion performed by the format converting device is specific to voice.

7. The format converting device as claimed in claim 5, wherein the bi-directional conversion performed by the format converting device is specific to frame relay.

8. The format converting device as claimed in claim 5, wherein the bi-directional conversion performed by the format converting device is specific to circuit emulation.

9. The format converting device as claimed in claim 5, wherein the bi-directional conversion performed by the format converting device is specific to native asynchronous transfer mode (ATM).

10. The format converting device as claimed in claim 5, wherein the cell processor is configured to maintain a plurality of output queues for routing of the control signal cells to the TDM bus, the queues being maintained on a priority scheme according to headers that include a virtual path identifier (VPI) and a virtual channel identifier (VCI).

11. The format converting device as claimed in claim 5, wherein the cell processor includes a mapping function for adding the additional headers to the control signal cells, respectively.

12. The format converting device as claimed in claim 1, wherein the cell processor includes a dedicated application-specific integrated circuit (ASIC).

13. A format converting device for performing bi-directional conversion between a time division multiplexing (TDM) interface and a packet communication interface within a telecommunication system comprising:
   a TDM bus connected to the TDM interface;
   a packet bus connected to the packet communication interface;
   a service-specific adaptation unit connected to and between each of the TDM bus and the packet bus, the service-specific adaptation unit configured to extract at least one TDM signal received from the TDM interface via the TDM bus and to convert the at least one TDM signal to a data packet signal and output the converted data packet signal to the packet bus for routing to the packet communication interface;
   the service-specific adaptation unit further configured to extract at least one data packet signal received from the packet communication interface via the packet bus, convert the at least one data packet signal to a TDM signal and output the converted TDM signal to the TDM bus for routing to the TDM interface;
   the service-specific adaptation unit including a control processor and a cell processor;
   the cell processor being coupled to the packet bus through a packet bus interface and being coupled to the TDM bus through an adaptation circuit and TDM bus interface; and
   the cell processor including a segmentation and reassembly interface connected to a separate segmentation and reassembly circuit, the cell processor being configured to route control signal cells to the control processor through the segmentation and reassembly interface.

14. The format converting device as claimed in claim 13, wherein the cell processor is configured to maintain a plurality of output queues for routing of the control signal cells to the TDM bus, the queues being maintained on a priority scheme according to headers that include a virtual path identifier (VPI) and a virtual channel identifier (VCI).

15. The format converting device as claimed in claim 13, wherein the service-specific adaptation unit includes a system control processor for transmitting and receiving control signal cells.

16. The format converting device as claimed in claim 13, wherein the cell processor includes a mapping function for adding additional headers to the control signal cells.

17. A format converting method comprising:
   receiving and transmitting time division multiplexing (TDM) data streams over a TDM bus of a format converter, the TOM bus being connected to system TDM interface;
   receiving and transmitting data packet streams that include IP packets over a packet bus of the format converter, the packet bus being connected to a system packet communication interface;
   performing bi-directional conversion using the format converter, the format converter including a service-specific adaptation module connected between the TDM bus and the packet bus;

extracting, by the service-specific adaptation module, at least one TDM signal received from the TDM interface via the TOM bus, converting the at least one TDM signal to a data packet signal, and outputting the converted data packet signal to the packet bus for routing to the packet communication interface;

further extracting, by the service-specific adaptation module, at least one data packet signal received from the packet communication interface via the packet bus, converting the at least one data packet signal to a TOM signal, and outputting the converted TDM signal to the TDM bus for routing to the TDM interface; and transmitting and receiving control signals via the packet bus to the format converter, and transmitting and receiving control signals over the TDM bus via a separate dedicated TDM control signal link.

18. The method as claimed in claim 17, further comprising the format converter maintaining a plurality of output queues for routing of cells to the TDM bus, the queues being maintained on a priority scheme according to headers that include a virtual path identifier (VPI) and a virtual channel identifier (VCI).

19. The method as claimed in claim 17, wherein the format converter includes a control processor and a cell processor including a segmentation and reassembly interface connected to a separate segmentation and reassembly circuit, the method further including the step of the cell processor routing control signal cells to the control processor through the segmentation and reassembly interface.

* * * * *